United States Patent [19]
Ote et al.

[11] Patent Number: 6,023,506
[45] Date of Patent: Feb. 8, 2000

[54] DATA ENCRYPTION CONTROL APPARATUS AND METHOD

[75] Inventors: Ichiro Ote, Chigasaki; Kazunori Iwabuchi, Yokohama; Hiroaki Washimi, Chigasaki; Hiroshi Furukawa, Yokohama; Masahito Sumitomo, Atsugi; Yuuichi Kobayashi, Kawasaki, all of Japan

[73] Assignee: Hitachi, Ltd., Tokyo, Japan

[21] Appl. No.: 08/738,907

[22] Filed: Oct. 28, 1996

[30] Foreign Application Priority Data

Oct. 26, 1995  [JP]  Japan ................................. 7-279325

[51] Int. Cl.⁷ .............................. H04L 9/00; G11B 23/28
[52] U.S. Cl. ..................... 380/4; 380/3; 380/23; 380/49
[58] Field of Search ..................... 380/4, 25, 54, 380/21, 23, 44, 49; 395/620, 670, 701, 888, 491, 404–406, 412, 413; 364/200, 900, 285.1, 222, 182, 187, 700

[56] References Cited

U.S. PATENT DOCUMENTS

| | | | |
|---|---|---|---|
| 4,757,533 | 7/1988 | Allen et al. | 380/25 |
| 5,319,705 | 6/1994 | Hlater et al. | 380/4 |
| 5,425,102 | 6/1995 | Moy | 380/25 |
| 5,495,533 | 2/1996 | Linehan et al. | 380/21 |
| 5,563,946 | 10/1996 | Cooper et al. | 380/4 |
| 5,577,125 | 11/1996 | Salahahour et al. | 380/54 |
| 5,584,023 | 12/1996 | Hsu | 395/620 |
| 5,598,470 | 1/1997 | Cooper et al. | 380/4 |
| 5,699,428 | 12/1997 | McDonnal et al. | 380/4 |
| 5,737,416 | 4/1998 | Cooper et al. | 380/4 |
| 5,751,814 | 5/1998 | Kafri | 380/49 |
| 5,757,908 | 5/1998 | Cooper et al. | 380/4 |
| 5,787,169 | 7/1998 | Elkridge et al. | 380/4 |
| 5,796,825 | 8/1998 | McDonnal et al. | 380/4 |
| 5,812,398 | 9/1998 | Nielson | 364/285.1 |

OTHER PUBLICATIONS

RSA Secure–Microsoft (refer to U.S.Patent No. 4,405,829).

*Primary Examiner*—Tod R. Swann
*Assistant Examiner*—Paul E. Callahan
*Attorney, Agent, or Firm*—Antonelli, Terry, Stout & Kraus, LLP

[57] ABSTRACT

An end-user oriented, file encryption control apparatus and method involving simple manipulations. File encryption is performed by conducting intuitive drag and drop manipulation with respect to an icon modeled after a safe. From the password for user authentication, an encryption key used for file encryption and decryption is automatically generated. All manipulations concerning the encryption key are concealed from users. A user interface section for performing encryption and decryption by conducting intuitive drag and drop manipulation with respect to an icon modeled after a safe, an automatic encryption key generation section for automatically generating an encryption key from a password, and a file encryption processing section for conducting file encryption processing without conducting authentication using a password are included. A file encryption function excellent in manipulation convenience is thus provided.

22 Claims, 15 Drawing Sheets

SAFE FOLDER (SAFE1)

DATA ENCRYPTION CONTROL APPARATUS AND METHOD

BACKGROUND OF THE INVENTION

The present invention relates to an information system, and method, for encrypting and holding personal information and secret information and preventing an information leak to a third person.

The spread of high-performance, highly portable computers such as laptop personal computers (PCs) and pen-input PCs results in increased occasions to use computers for the purpose of business in various places other than the office such as the destination of one's business trip. The spread of such portable computers is poses the problem of information leaks due to theft and loss of computers.

On the other hand, computers such as PCs have come into wide use in homes as well with the advance of multimedia. In the case of such a computer for home, the computer is often shared by the family and the personal information protecting function is being needed.

Because of such portability of computers and penetration of computers to homes, there is a need for the security function at the end user level to prevent a leak of secret information and personal information relating to business.

As for the security function coping with these needs, the file encryption function for encrypting secret information files and personal information files by using an encryption key and protecting them from being accessed by a third person having no encryption key is known as an effective technique. For example, the RSA public key is disclosed in U.S. Pat. No. 4,405,829.

In the conventional file encryption function, an encryption key kept secret from a third person was used for encryption processing. At the time of file encryption and decryption, therefore, preparation manipulation such as encryption key opening manipulation using password input is necessary for the user to manage the encryption key. Furthermore, management of the encrypted file has been entrusted to the user. For example, it has been necessary for the user to remember on the user's own responsibility which encryption key has been used to encrypt the file in order to decrypt the file afterwards. Thus the conventional file encryption function had the following problems. Expert knowledge is typically neccessary. Because of complicated manipulation, manipulation was difficult for the end user, and the end user could not easily use the conventional file encryption function. In general, therefore, a high-degree security function such as file encryption has been intended for the user performing certain special business.

SUMMARY OF THE INVENTION

The present inventors have taken note of the fact that the user could encrypt and decrypt a file without being conscious of an encryption key by automatically generating the encryption key. The present inventors have considered the fact that blanket management of files encrypted by using a specific encryption key made user's management of the individual encrypted files unnecessary. Furthermore, the present inventors have considered the fact that the encrypted file could be protected even without always performing the user authentication at the time of encryption manipulation provided that user authentication has been conducted only at the time of manipulation of file decryption.

Therefore, an object of the present invention is to provide a file encryption control apparatus and method, which release the user from the management of the encryption key and the encrypted files on the basis of the above described facts and which make it possible to encrypt files by effecting a simple manipulation, i.e., by selecting a plain text file on the screen and by starting the encryption processing by means of a graphic metaphor such as an icon.

In order to achieve the above described object, a file encryption control apparatus according to one aspect of the present invention includes encryption/decryption means for encrypting and decrypting a plain text file specified by the user by using an encryption key, encryption information storage means (hereafter referred to as encryption folder) disposed on the memory device to store and manage collectively encrypted files encrypted by the encryption/decryption means by using a specific encryption key, encryption folder generation means for generating a plurality of encryption folders on the memory device and assigning encryption keys and authentication passwords to the encryption folders respectively independently, and storage means for storing authentication passwords used to perform authentication when the user accesses an encryption folder.

In accordance with another aspect of the present invention, the encryption control apparatus includes internal data encryption/decryption means for encrypting internal data relating to encryption within the encryption folder, file name conversion means for converting the file name of the unencrypted file to an internal encrypted file name of the encryption folder, and a table disposed in the encryption folder to store association of the unencrypted file names with the encrypted file names.

In accordance with another aspect of the present invention, the encryption control apparatus includes automatic encryption key generation means for automatically generating encryption keys on the basis of the authentication passwords, and an authentication password storage area for registering and holding authentication passwords within the encryption folder.

An outline of operation of the encryption control apparatus according to the present invention will now be described.

An encryption folder is generated beforehand on the memory device by the encryption folder generation means. A unencrypted file selected by the user is encrypted by the encryption/decryption means by using the encryption key assigned to the encryption folder. A resulting encrypted file is automatically stored in the encryption folder and stored and managed collectively. Therefore, it can be made unnecessary for the user to manage each of the encrypted files individually. When the user accesses the encryption folder and encrypts/decrypts a file, the encryption/decryption means determines whether the user is a proper user or authorized user by using the authentication password assigned to the encryption folder and thus protects the encryption folder from being accessed improperly.

As for the encrypted file name stored in the encryption folder, the plain text file name recognized by the user is converted to an internal encrypted file name by the file name conversion means. Internal data of the encryption folder for storing and managing the encrypted files are also encrypted by the internal data encryption/decryption means. Thereby, the encrypted files stored in the encryption folder can be concealed from users and protected from improper access to the internal data and false manipulation.

The automatic encryption key generation means automatically generates the encryption key on the basis of the authentication password inputted by the user in order to access the encryption folder. Thereby, it is made unnecessary for the user to conduct the complicated manipulation and management of the encryption key.

In the case where the encryption folder generation means presets the authentication password storage area within the encryption folder when generating the encryption folder and the authentication password inputted by the user is encrypted by the internal data encryptior/decryption means and registered and held in the authentication password storage area, the encryption/decryption means omits the authentication using the authentication password input, reads out the authentication password registered in the authentication password storage area, decrypts the authentication password by using the internal encryption/decryption means, automatically generates the encryption key, and encrypts the file. Without inputting the authentication password, therefore, the user can encrypt the file by means of a very simple manipulation, i.e., by selecting a plain text file and starting the encryption/decryption means.

Especially if at the time of encryption folder generation the encryption folder generation means displays a graphic metaphor, such as an icon of a safe, reminding the user of an image of an encryption apparatus for each of the encryption folders on the screen of the computer and the encryption/decryption means is adapted to be started in response to the selection manipulation of the graphic metaphor, then a file can be encrypted by simple intuitive manipulations on the screen., i.e., by selecting a plain text file from the file managing function by means of a pointing device such as a mouse and subsequently selecting the graphic metaphor. An encryption function which can be manipulated easily by ordinary users can be thus provided.

DESCRIPTION OF THE PREFERRED EMBODIMENTS

Figure 2:
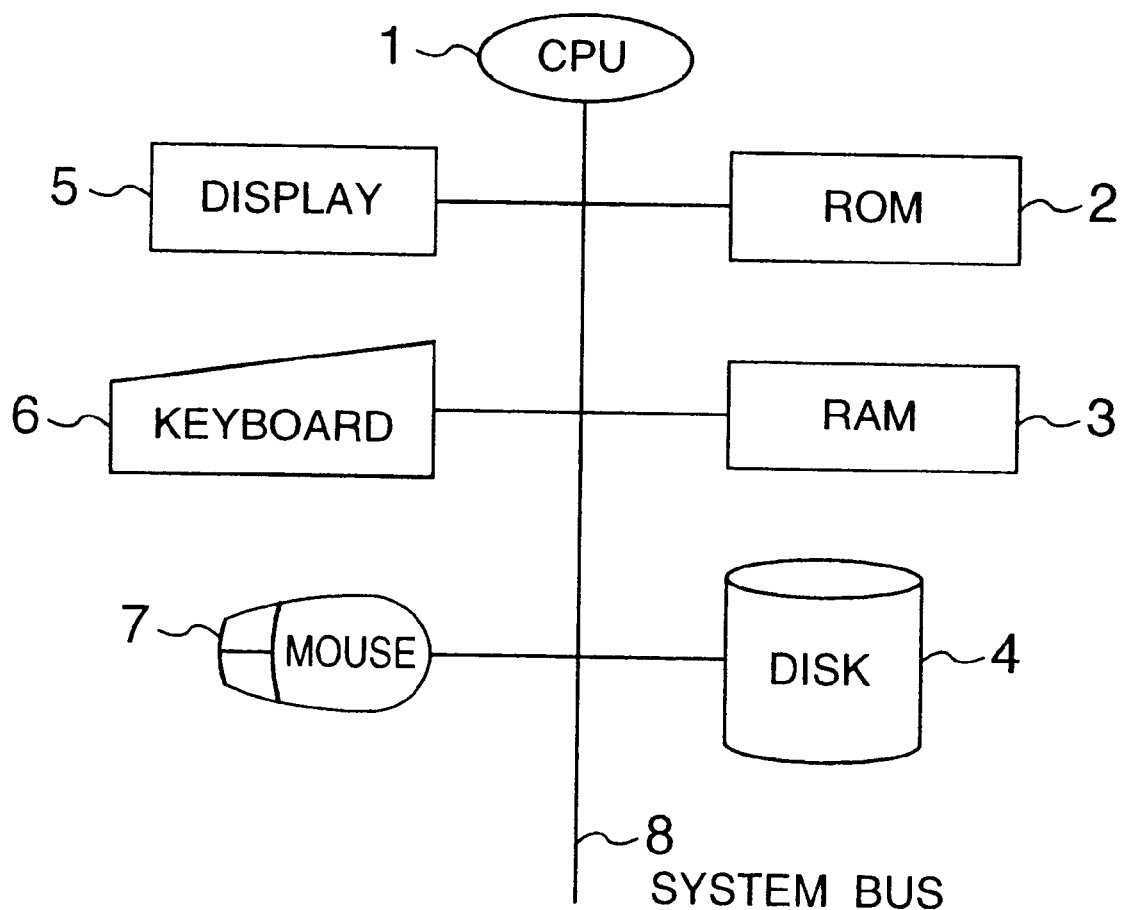
FIG. 2 is a block diagram showing the basic system configuration to which the present invention is applied.

Hereafter, preferred embodiments of the present invention will be described by referring to the drawing. FIG. 2 shows the basic configuration of a system implementing an encryption control apparatus according to the present invention. The system includes a CPU 1, a ROM 2, a RAM 3, a disk device 4, a display device 5, a keyboard 6, a mouse 7, and a system bus 8. Each control program implementing the present invention is stored beforehand on the disk 4, loaded into the RAM 4, and executed by the CPU 1. Each data area is processed on the RAM 4, and thereafter data to be preserved Eire stored on the disk 4.

Figure 1:
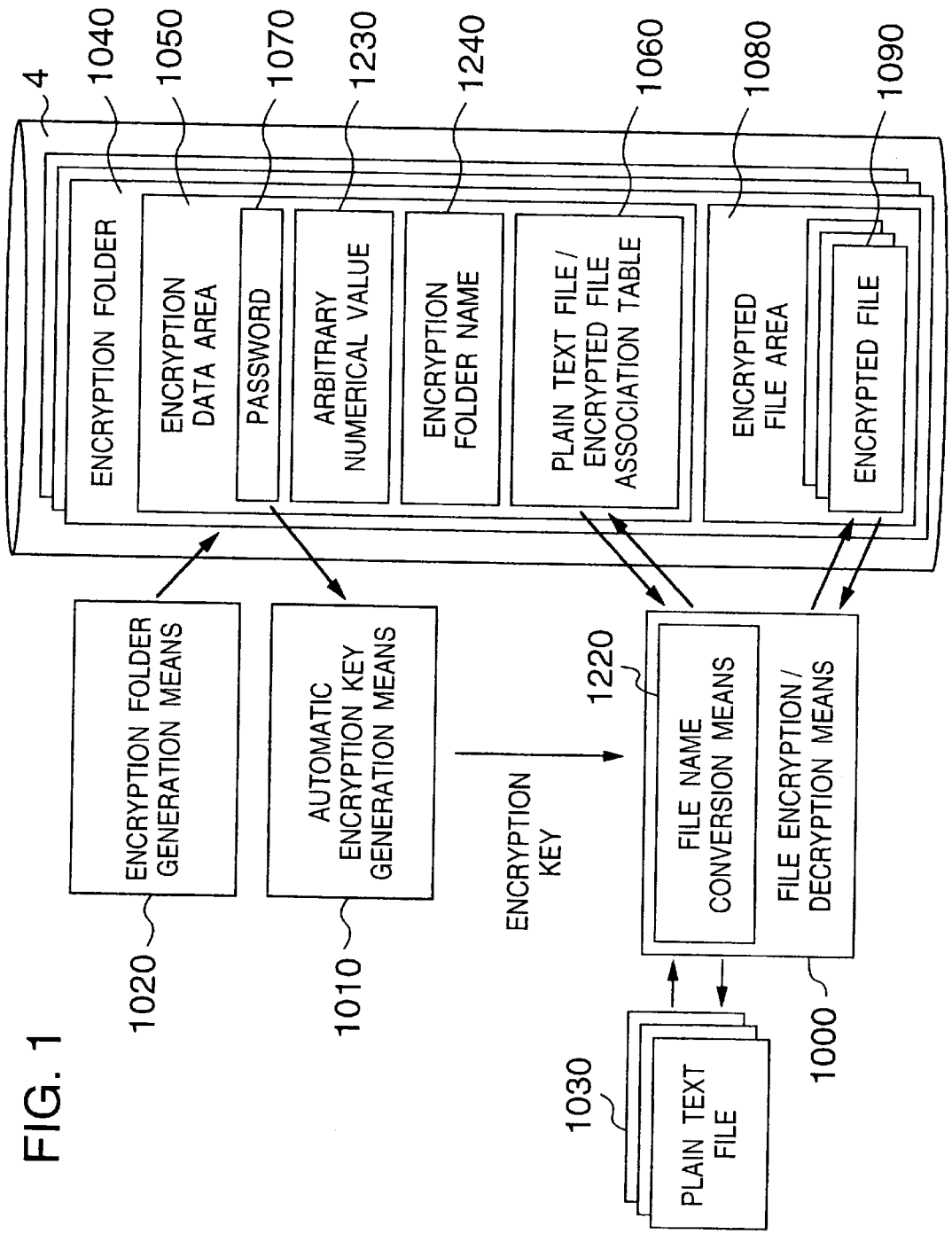
FIG. 1 is a block diagram showing an embodiment of the present invention.

FIG. 1 shows the block diagram of a preferred embodiment implementing the present invention. The basic configuration of the present invention will now be described. Numeral 1000 denotes file encryption/decryption means for encrypting and decrypting a file by using an encryption key. Numeral 1220 denotes file name conversion means for converting a file name from a plain text file name to an internal encrypted file name. Numeral 1010 denotes automatic encryption key generation means for automatically generating an encryption key from a password which forms a feature of the present invention. Numeral 1030 denotes a plain text file to be encrypted. Numeral 1040 denotes an encryption folder on the disk 4 which forms a feature of the present invention. The encryption folder is formed by an encrypted file area 1080 for storing an encrypted file 1090 obtained by encrypting the unencrypted or plain text file 1030 and an encryption data area (data area for file encryption) 1050 storing information for managing the encryption file 1040. The encryption data area 1050 stores a plain text file/encrypted file association table 1060 for managing the association of plain text file names before encryption with encrypted file names after encryption, a password 1070 used for authentication when a user accesses the encryption folder, an arbitrary numerical value 1230 used when an encryption key is automatically generated from the password 1070 and an encryption folder name 1240. The encrypted data area 1050 includes their respective storage areas. Numeral 1020 denotes encryption folder generation means for generating the encryption folder 1040. The encryption folder generation means makes it possible to generate a plurality of encryption folders on the disk 4.

In the present embodiment, at least one encryption folder 1040 is generated on the disk 4 by the encryption folder generation means 1020 as initialization in order to encrypt a file. The encryption folder generation means 1020 creates a directory forming an encryption folder. The directory includes a file forming the encryption data area 1050 and a sub-directory forming the encrypted file area 1080. When creating the encryption folder 1040, the user is requested to input the password 1070, the arbitrary numerical value 1230, and the encryption folder name 1240. The password 1070, the arbitrary numerical value 1230, and the encryption folder name 1240 inputted by the user are encrypted and stored in the encryption data area 1050. Encryption of data to be stored in the encrypted data area 1050 is conducted by using an encryption key prepared exclusively for encryption of the internal data in order to prevent the data from being referred to.

The encryption key used by the file encryption/decryption means 1000 to perform encryption is generated by the automatic encryption generation means 1010 in performing encryption or decryption, on the basis of the password 1070 and the arbitrary numerical value 1230 encrypted and stored in the encryption data area 1050. The automatic encryption key generation means 1010 takes out the password 1070 and the arbitrary numerical value 1230, decrypts them, performs synthesis while applying bit manipulation such as an appropriate bit shift and operation to them, and automatically generates a unique encryption key for each encryption folder. The arbitrary numerical value 1230 has a bit size large enough to generate an encryption key from the password 1070. When the encryption folder 1040 is to be generated, the arbitrary numerical value is inputted by the user only once. In an alternative method as in an embodiment which will be described afterwards, the automatic encryption key generation means 1010 automatically generates the encryption key from the registered password 1070 when generating the encryption folder, encrypts the encryption key, and stores it in the encryption data area 1050 together with the password. In this case, the registered encryption keys can be used. Therefore, it is not necessary to successively generate encryption keys.

Encryption of the unencrypted file 1030 is conducted by the file encryption/decryption means 1000. If file encryption is instructed by the user, the file encryption/decryption means 1000 first makes the automatic encryption key generation means 1010 automatically generate an encryption key from the password 1070 of the encryption folder 1040 specified by the user. By using the encryption key generated automatically and implicitly, the unencrypted file 1030 specified by the user is encrypted and stored in the encrypted file area 1080 of the encryption folder 1040 as the encrypted file 1090. By thus storing the password 1070 in the encryption folder 1040 beforehand at the time of encryption folder creation, automatically generating the encryption key on the basis of the password 1070, and encrypting a file by using the encryption key, it becomes possible to encrypt a file by conducting only a simple manipulation, i.e., selection of a file and start of the file encryption/decryption means 1000, without requesting the user to input a password for authentication and conduct processing of opening the encryption key.

When storing the encrypted file 1090, the file encryption/decryption means generates a unique internal name for each encryption file 1090 by using the file name conversion means 1220, stores the encrypted file 1090 in the encrypted file area 1080 by using the name, and makes the encryption folder 1040 an area concealed from users. In order to restore the original noncryptic file at the time of decryption, the name of the associated unencrypted (or plain text) file 1030 and the name of the encrypted file 1090 are stored in the noncryptic fi-e/encrypted file association table 1060 of the encrypted data area 1050. Thus, owing to the encryption of the encrypted data area 1050 using the encryption key for the internal data encryption and conversion of the encrypted file name using the file conversion means 1220 and the unencrypted file/encrypted file association table 1060, the encryption folder 1040 is concealed from users and users are released from the management of the encrypted file and the encryption key.

Decryption of an unencrypted file 1090 is also conducted by the file encryption/decryption means 1000. Upon starting the file encryption/decryption means 1000 to conduct decryption, the file encryption/decryption means 1000 conducts authentication processing by using the password 1070 with respect to a user input password, then refers to the unencrypted file/encrypted file association table 1060, and displays a list of encrypted files 1090 stored in the encrypted file area 1080 in the form of unencrypted file names. In this state, the encryption folder 1040 is open. The user can select unencrypted files 1090 stored in the encrypted file area 1080 out of the list displayed in the form of uncrypted file names. If the user selects at least one encrypted file 1090 out of the list and starts the file encryption/decryption means 1000 again, then the file encryption/decryption means 1000 first generates an encryption key automatically from the password 1070 by using the automatic encryption key generation means 1010. Subsequently, the file encryption/decryption means 1000 refers to the unencrypted file/encrypted file association table 1000, converts the unencrypted file name selected by the user to the name of the encrypted file by using the file name conversion means 1220, and takes out the encrypted file from the encrypted file area 1080. Furthermore, the file encryption/decryption means 1000 decrypts the encrypted file by using the automatically generated encryption key and restores the original unencrypted file having the noncryptic file name.

By thus using the automatic encryption key generation means 1010, the file name conversion means 1220, and the unencrypted file/encrypted file association table 1060 at the time of file decryption as well, file decryption can be effected by conducting simple manipulations, i.e., by inputting the password 1070, selecting an encrypted file by means of a unencrypted file name, and starting the file encryption/decryption means 1000.

Figure 3:
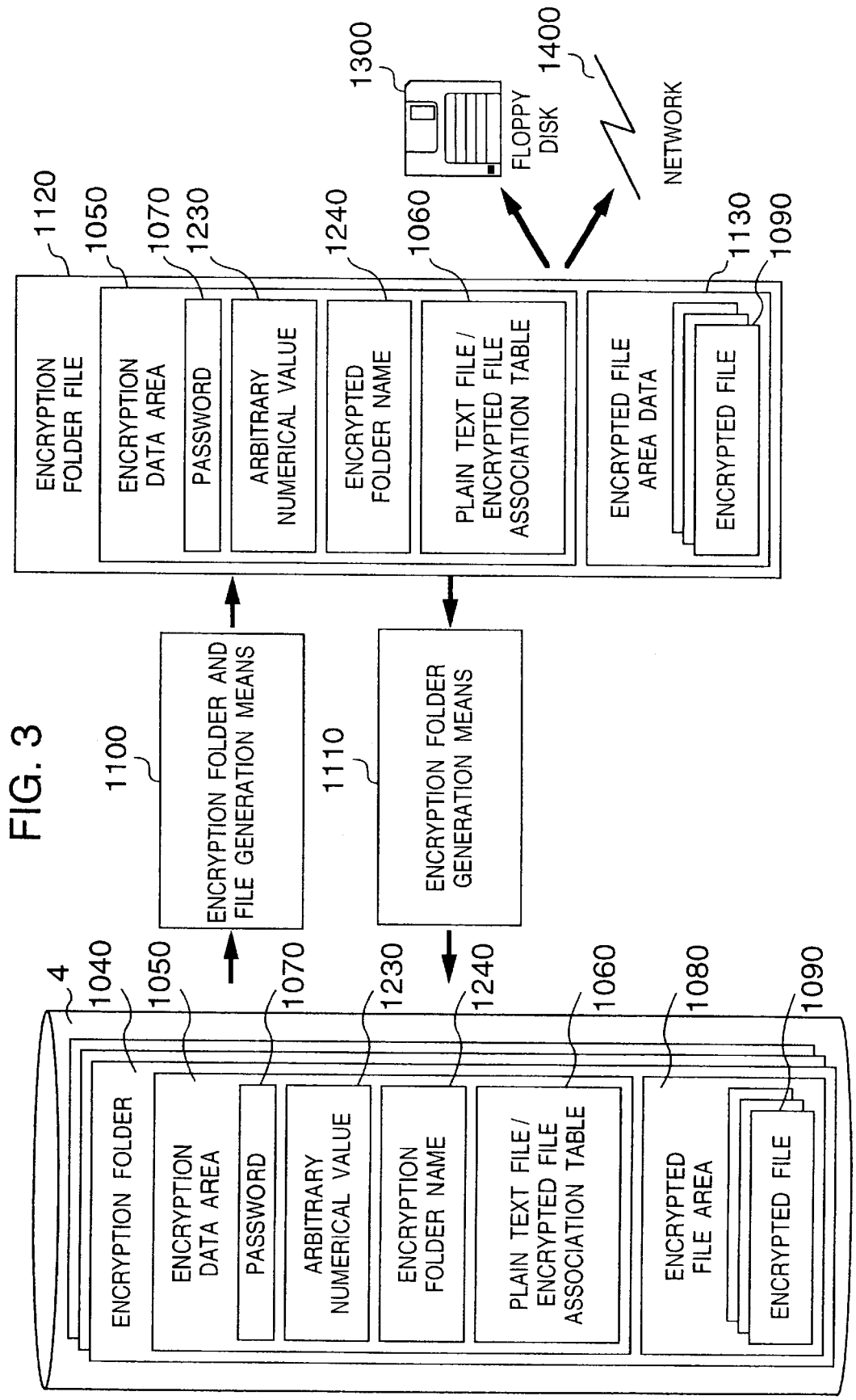
FIG. 3 is a block diagram showing another embodiment of the present invention.

An embodiment in which the encryption folder is converted to an external file for the purpose of transferring the encryption folder to another computer via a medium, such as a floppy disk, or a network will now be described by referring to FIG. 3. An encryption folder 1040 shown in FIG. 3 is identical to the encryption folder shown in FIG. 1. Upon being requested by the user to convert the encryption folder to an external file, the encryption folder file generation means 1100 reads out data of the encrypting data area 1050 and data of the encrypted file 1090 of the encryption file area 1080 associated with the encryption folder 1040 selected by the user, combines them into a single file to create an encryption folder file 1120. The encryption folder file 1120 is outputted to a specific directory or the floppy disk (FD) 1300 as an external file.

The encryption folder file 1120 can be transferred to a computer having the file encryption function according to the concept of the present invention preset therein via the floppy disk 1330 or the network 1400, and the encryption folder file 1120 can be restored to the encryption folder 1040 by the encryption folder generation means 1110. The encryption folder generation means 1110 reads out data of the encrypted data area 1050 and the encrypted file area data 1130 from the encryption folder file 1120. On the basis of the data thus read out, the encryption folder generation means 1110 generates the encryption folder 1040 on a disk 4 connected to the computer of destination in the same way as the encryption folder generation means 1020. Exactly in the same way as the embodiment of FIG. 1, the encrypted file stored in this encryption folder can be decrypted by inputting the password.

In the embodiment of FIG. 3, a single file is used as the encryption folder file 1120. In the case where the operating system (OS) of the computer supports transfer of each directory, however, it is also possible, as a matter of course, to put together the data of the encryption folder 1040 of the encryption folder file group as a suitable directory (encryption folder) and store the data in a medium such as the floppy disk 1300 as an external file group.

If the encryption folder file 1120 is formed by a single file as in the embodiment of FIG. 3, then the size of the encryption folder file 1120 becomes large in some cases because data of a plurality of encrypted files are contained therein. In this case, the size of the encryption folder file 1120 can be reduced by conducting data compression processing when generating the encryption folder file 1120 by using the encryption folder file generation means and by conducting expansion processing when generating the encryption folder 1040 by using the encryption folder generation means 1110.

Figure 4:
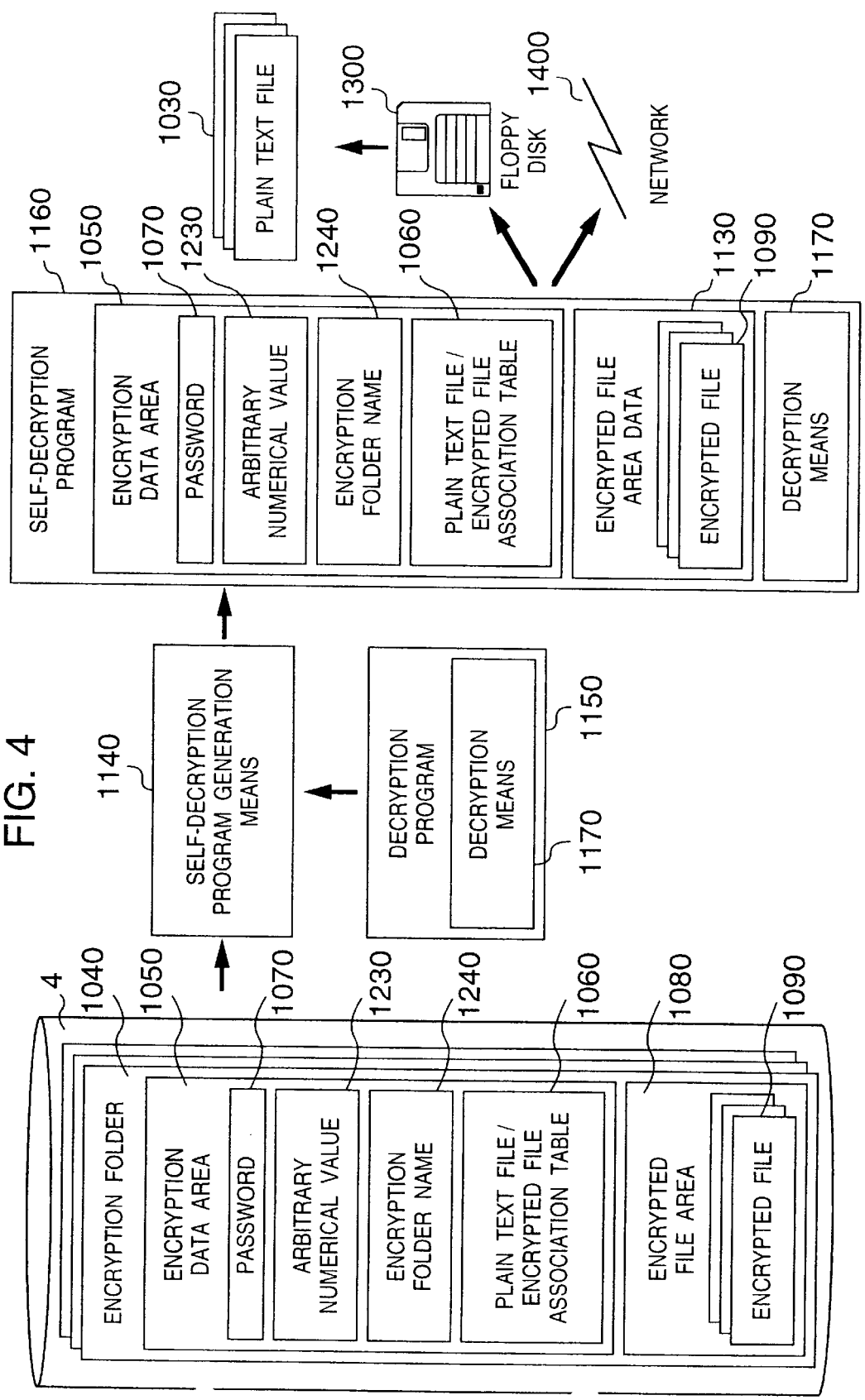
FIG. 4 is a block diagram showing another embodiment of the present invention.

The embodiment of FIG. 3 is premised on that a file encryption system according to the concept of the present invention is preset in the computer to which the encryption folder file 1120 is transferred. This is inconvenient in the case where encrypted files are distributed to arbitrary computers. Therefore, another embodiment shown in FIG. 4 is configured so that encrypted files in the encryption folder file may be developed in computers having no file encryption systems according to the concept of the present invention preset therein.

A self-decryption file generation means 1140 reads out data of the encryption data area 1050 and the encrypted file area 1080 and combines them. As the data to be decrypted, the data thus read out is linked to a file of a decryption program 1150 formed by decryption means 1170 having a function equivalent to the decryption processing of the file encryption/decryption means 1000 and the automatic encryption key generation means 1010. Thus the self-decryption file generation means 1140 generates a file of a self-decryption program 1160. The self-decryption program 1160 is outputted to a specific directory on the disk 4 and the floppy disk 1300 as an external file.

When the self-decryption program 1160 is transferred to another computer and executed, decryption means 1170 is started. The decryption means 1170 reads out data of the encrypted data area 1050 and the encrypted file area data 1130 from the data of the linked encryption folder 1040 as internal data. The decryption means requests the user to input a password and compares it with the password 1070. In the case of a proper password, the decryption means starts processing of decryption. Processing of automatically generating the encryption key from the password 1070 and decrypting data of the encrypted file 1090 is the same as that of the embodiment of FIG. 1. The decrypted file 1030 is outputted to a directory specified by the user. If necessary, the self-decryption program 1160 itself is finally deleted, and the self-decryption processing is finished. Owing to the present embodiment, encrypted files can be transferred, via the network 1400 by taking an encryption folder as the unit, to a user of an arbitrary computer capable of executing a program. The range of application of the present invention is widened significantly.

Figure 5:
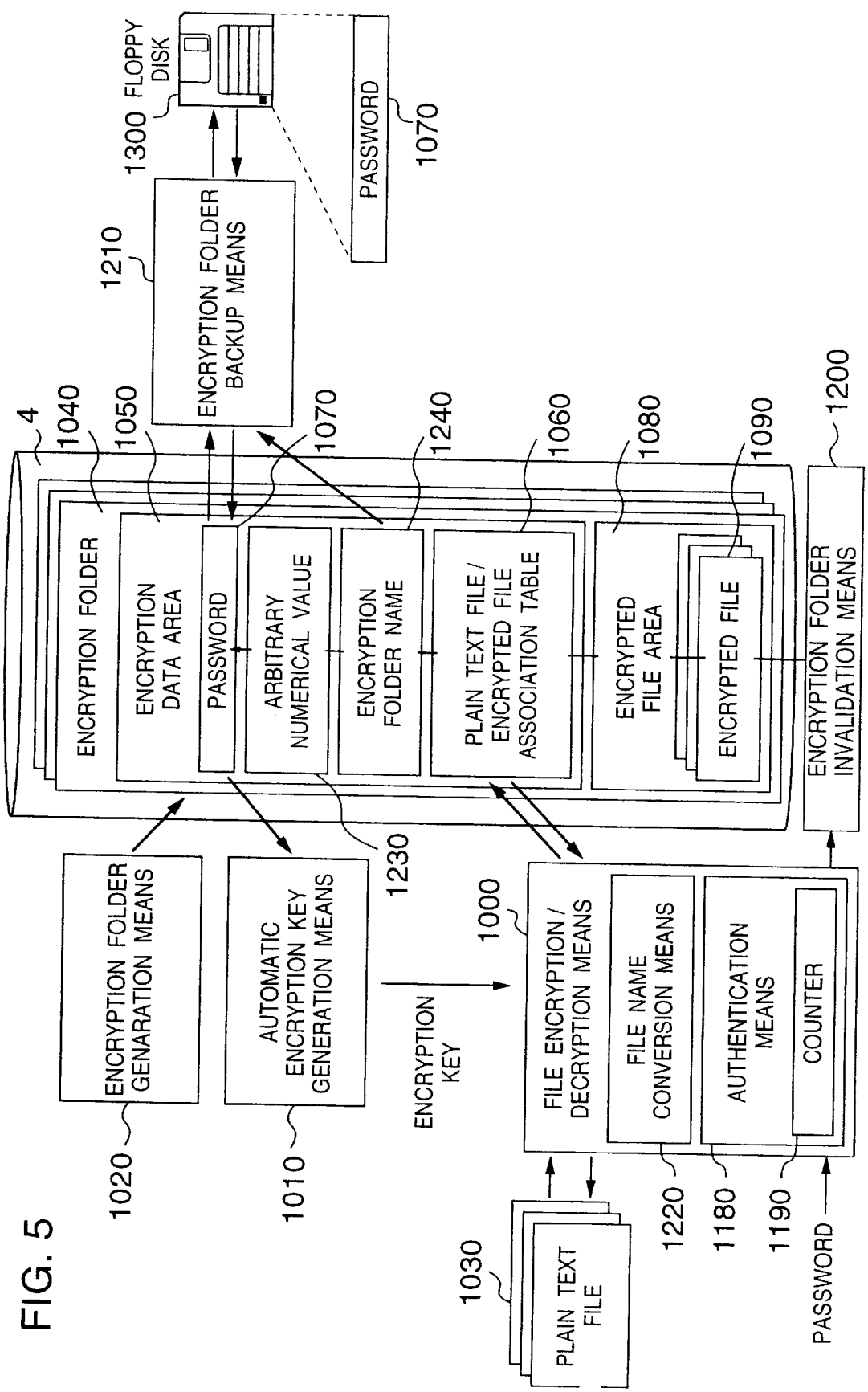
FIG. 5 is a block diagram showing another embodiment of the present invention.

A method for limiting the number of times of inputting an improper password to prevent improper access to the encryption folder will now be described by referring to FIG. 5. File encryption/decryption means 1000, automatic key generation means 1010, encryption folder generation means 1020, and an encryption folder 1040 have the same configuration as those of FIG. 1 have. Numeral 1180 denotes authentication means for conducting user authentication by using a password when the user accesses the encryption folder 1040. Numeral 1190 denotes a counter for counting the times of inputting an improper password. Numeral 1200 denotes encryption folder invalidation means for invalidating the encryption folder 1040 when an improper password has been inputted by a user and thus preventing improper access to the encryption folder 1040. Numerical 1210 denotes encryption folder backup means for backing up the encryption folder before the encryption folder is invalidated so that the encryption folder 1040 invalidated by the encryption folder invalidation means 1200 may be restored.

When decrypting the encrypted file 1090 stored in the encryption folder 1040, the file encryption/decryption means 1000 requests the user to input a password for accessing the encryption folder 1040 by using the user authentication means 1180. When a password is inputted from the user, the authentication means 1180 compares the inputted password with the password 1070 stored in the encryption folder. Upon coincidence, the authentication means 1180 judges the user to be a proper user and notifies the file encryption/decryption means 1000 that the user is a proper user, thus processing of the file encryption/decryption means 1000 being advanced. If, on the other hand, an improper password is inputted, the authentication means 1180 increases the count in the counter 1190 by one at one time. However, the counter 1190 is cleared when the proper password is inputted. If improper passwords are inputted consecutively and the count in the counter 1190 exceeds a predetermined number of times, say, three, the authentication means 1180 instructs the encryption folder invalidation means 1200 to invalidate the encryption folder 1040.

Upon being instructed by the authentication means 1180, the encryption folder invalidation means 1200 deletes the password stored in the encryption folder 1040. Upon confirming that the password has been deleted, the authentication means 1180 suspends the authentication processing and notifies the user that the encryption folder is invalid as a message. If the password is deleted once, therefore, access to the encryption folder 1040 becomes impossible thereafter.

If invalidated, even a proper user cannot access the encryption folder 1040. Therefore, means for a proper user to restore the encryption folder 1040 which has been invalidated becomes necessary. Thus the encryption folder backup means 1210 provides a function of backing up the encryption folder 1040.

When backing up the encryption folder 1040, the encryption folder backup means 1210 copies the contents of the password 1070 to a removable medium such as the floppy disk 1300. Furthermore, the encryption folder backup means 1210 records the encryption folder name 1240 on the floppy disk 1300 as information specifying the encryption folder 1040. At the time of restoration, the encryption folder backup means 1210 effects comparison of the encryption folder name, confirms that the backed up contents of the floppy disk 1300 agree with those of the encryption folder 1040, copies the password 1070 backed up in the floppy disk 1300 to the encryption folder 1040, and restores the encryption folder 1040 to the original state.

For preventing the floppy disk 1300 used for backup from being used for the purpose of improper (unauthorized) restoration processing, a comparison of the encryption folder name 1240 is effected at the time of restoration using the floppy disk 1300, thereafter the user is requested to input the password, and it is determined whether the inputted password coincides with the password 1070 stored in the floppy disk 1300. Improper restoration processing conducted by a third person can be thus prevented.

Owing to this encryption folder backup means 1210, the backup of the encryption folder can be secured in the floppy disk, for example, beforehand in preparation for the invalidation of the encryption folder 1040. Even if the encryption folder 1040 is invalidated by improper password input, therefore, the user can restore the encryption folder 1040 by using the floppy disk 1300 and access the encryption folder 1040 again.

The backup manipulation of the encryption folder backup means 1210 is allowed after authentication using the password, and the restoration manipulation is allowed at any time. Thereby, only proper (authorized) users can back up the encryption folder 1040 and restore the encryption folder 1040 even if it has been invalidated, and improper backup can be prevented from being conducted by a third person.

Figure 6:
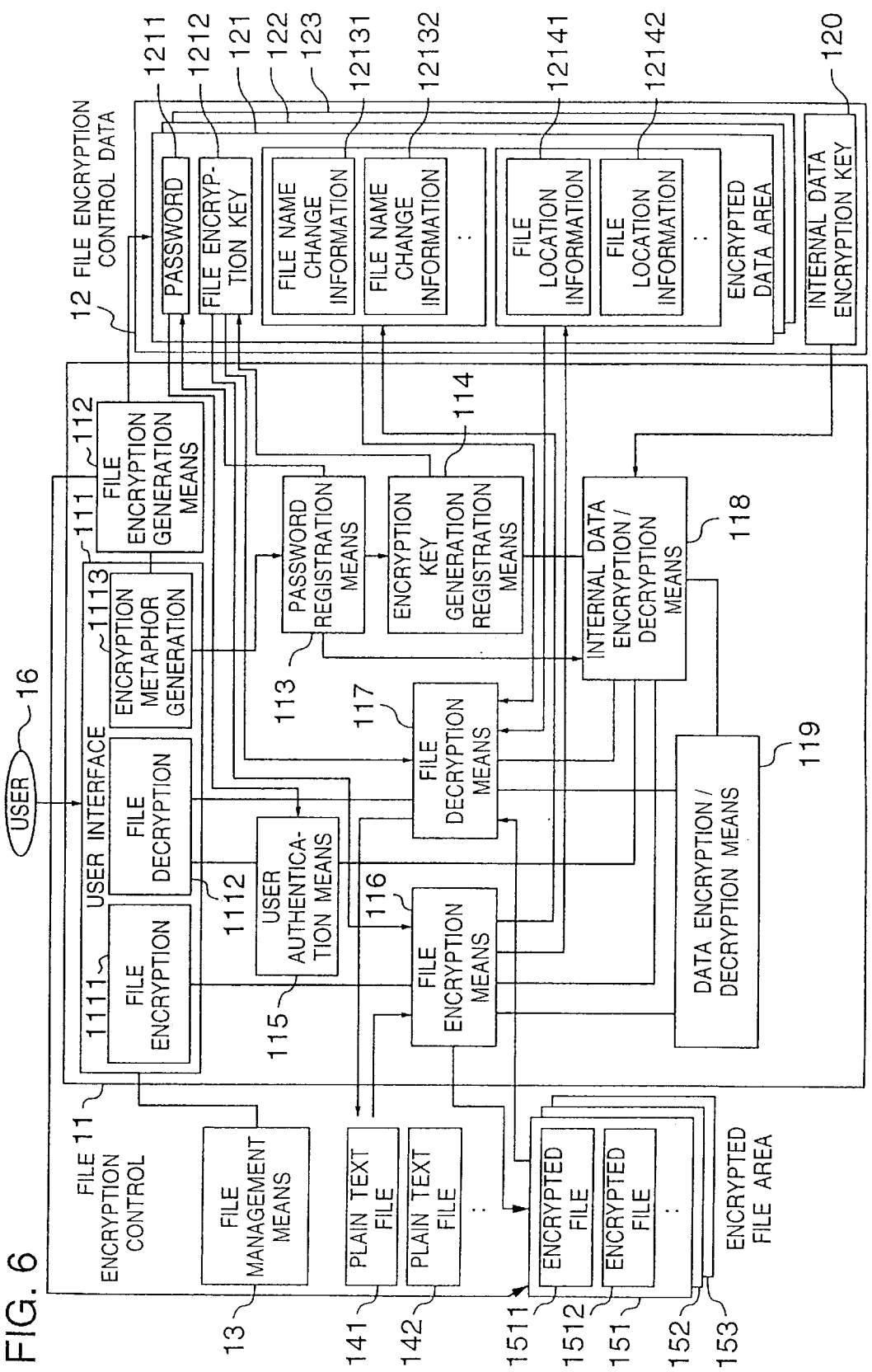
FIG. 6 is a block diagram showing another embodiment of the present invention.

FIG. 6 shows the block diagram of an embodiment of the present invention. The embodiment will now be described in more detail.

Numeral 11 denotes a file encryption control program implementing the present invention. Numeral 111 denotes a user interface portion used for the user to conduct file encryption. Numeral 1111 denotes a user interface for file encryption. This user interface 1111 implements the simple manipulation of file encryption forming a feature of the present invention. Numeral 1112 denotes a user interface for file decryption. Numeral 1113 denotes a user interface of file encryption metaphor registration for registering a metaphor to be manipulated when the user performs file encryption. By using this encryption metaphor, the user interface 1111 implements the above described simple manipulation of file encryption. Numeral 112 denotes file encryption area generation means for securing a data area required for file encryption on the disk 4. Numeral 113 denotes password registration means for registering beforehand a password required for authentication of a user. Numeral 114 denotes encryption key generation and registration means for generating and registering a password required for file encryption. By using a password inputted by the user, the encryption key generation and registration means conducts automatic encryption key generation which forms a feature of the present invention. Numeral 115 denotes user authentication means for comparing the password inputted by the user with the password registered beforehand to conduct authentication of the user. Numeral 116 denotes file encryption means for conducting file encryption while taking a file as the unit. Numeral 117 denotes file decryption means for conducting file decryption while taking a file as the unit. Numeral 118 denotes internal data encryption/decryption means for implementing internal data encryption to hold the secrecy of encrypted files. Numeral 119 denotes data encryption/decryption means for encrypting/decrypting data by using a given encryption key.

Numeral 12 denotes file encryption control data for controlling the file encryption control program 11. The file encryption control data are processed on the memory and preserved on the disk 4 to be effective at the time of system restart as well. Numerals 121, 122 and 123 denote encrypted data areas for storing control data which are included in the file encryption control data 12 and which should be encrypted and stored on the disk 4 in order to hold secrecy of encrypted files. Numeral 1211 denotes data of the password inputted by the user. Numeral 1212 denotes data of the automatically generated file encryption key. Numerals 12131 and 12132 denote file name change information holding association relations between original noncryptic file names and encrypted file names after change obtained when names are altered for the purpose of concealing encrypted files from users. Numerals 12141 and 12142 denote file location information representing file locations on the disk 4 in which the encrypted files existed before encryption. Numeral 120 denotes an internal data encryption key for encrypting internal data.

Numeral 13 denotes file management means providing a management function for the user to manipulate and manage files located on the disk device 4.

Numerals 141 and 142 denote unencrypted files stored on the disk 4 to be encrypted. In the present embodiment, the file management means is used to notify, in accordance with the user's instruction, the file encryption control program 11 of the unencrypted files 141 and 142 to be encrypted.

Numerals 151, 152 and 153 denote encrypted file areas secured on the disk 4 to store data 1511 and 1512 of encrypted files.

Correspondence relations between the components of FIG. 6 and the components of FIG. 1 will now be described. The file encryption area generation means 112 and the password registration means 113 correspond to the encryption folder generation means 1020. The encryption key generation and registration means 114 correspond to the automatic encryption key generation means 1010. The file encryption means 116, the file decryption means 117, and the data encryption/decryption means 119 corresponds to the file encryption/decryption means 1000. The encrypted data areas 121, 122 and 123 correspond to the encrypted data area 1050. The password 1211 corresponds to the password 1070. The file name change information 12131 and 12132 correspond to the unencrypted file/encrypted file association table 1060. The unencrypted files 141 and 142 correspond to the unencrypted file 1030. The encrypted file areas 151, 152 and 153 correspond to the encrypted file area 1080. The encrypted files 1511 and 1512 correspond to the encrypted file 1090.

Procedure of the file encryption metaphor registration, procedure of the file encryption, and procedure of the file decryption will now be described by referring to flow charts.

Figure 7:
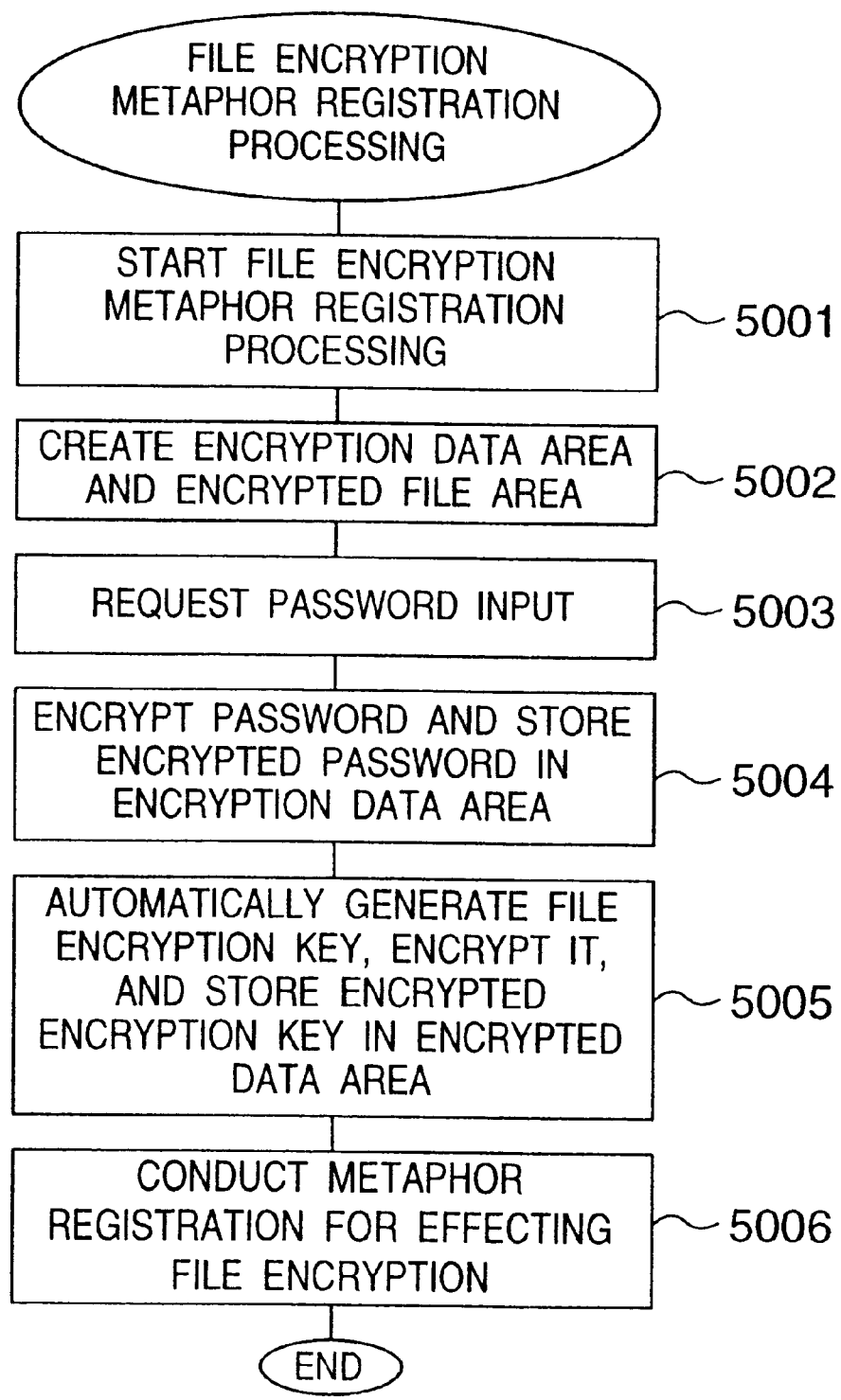
FIG. 7 is a flow chart of file encryption metaphor registration processing.

FIG. 7 shows a flow chart of processing procedure for file encryption metaphor registration. When the user starts the file encryption metaphor registration processing by manipulating the encryption metaphor generation means (program) 1113 which is the user interface (step 5001), the user interface 1113 first controls the file encryption area generation means 112 and creates the encrypted data area 121 and the encrypted file area 151 as a file on the disk 4 and a directory on the disk 4, respectively (step 5002). These files and directories are created under the directory on the disk 4 storing the encryption control program 11, for example. Furthermore, in the present embodiment, the encrypted data areas 122, 123 and so on and the encrypted file areas 152, 153 and so on are created by the file encryption area generation means 112 at any time whenever the user creates a metaphor, in order to allow the user to create a plurality of metaphors for encryption by using the user interface 1113. By manipulating respectively independent metaphors, therefore, the user can sort files and store the files in independently preset storage areas for encrypted files. In association with respective users and respective file kinds, for example, the user can sort, encrypt and preserve files. Subsequently, the user interface 1113 requests the user to input a password (step 5003). The password inputted by the user is delivered to the password registration means 113. By using the internal data encryption key 120, the password registration means 113 makes the internal data encryption/decryption means 118 encrypt the password inputted by the user. The internal data encryption/decryption means 118 encrypts data by using the data encryption/decryption means 119. Upon encryption of the password, the password registration means 113 stores the encrypted password on the disk 4 as the password 1211 (step 5004). When the registration of the password is finished, the password registration means 113 delivers the password before the encryption to the encryption generation and registration means 114. Upon receiving the password, the encryption key generation and registration means 114 automatically generates an encryption key by combining the password with a numerical value uniquely assigned beforehand to each encrypted data area and conducting bit manipulation, for example. Furthermore, the encryption key generation and registration means 114 encrypts -he generated encryption key by using the internal data encryption key 120 and the internal data encryption/decryption means 118 and stores the encrypted encryption key on the disk 4 as the file encryption key 1212 (step 5005). Upon completion of the generation and registration processing of the encrypted file areas 151, 152 and 153, and the encrypted data areas 121, 122 and 123 heretofore described, metaphor registration processing for effecting file encryption is finally conducted (step 5006). The metaphor registration will be described afterwards by referring to another embodiment.

The processing procedure at the time of file encryption will now be described by referring to a flow chart shown in FIG. 8. After the above described encryption metaphor registration processing has been conducted, the user executes the file encryption control program 11 (step 6001). Thereupon, the user interface 1111 first displays the metaphor of file encryption to be used for the user to manipulate the encryption processing. By manipulating a pointing device such as the mouse 7, the user selects a unencrypted file to be encrypted on the user interface of the file management means 13, and subsequently selects a file encryption metaphor. Thereupon, the user interface 1111 starts the file encryption processing for the selected unencrypted file (step 6002). These interfaces will be described in detail afterwards by referring to another embodiment. In the case where the unencrypted file 141, for example, is selected, the user interface 1111 delivers the unencrypted file name to the file encryption means 116, first of all. Upon receiving the unencrypted file name to be encrypted, the file encryption means 116 creates an encryption file name (step 6003). This encrypted file name is generated so as to be unique to each of encrypted files by combining a serial number created from the count of times of encryption processing with specific letters, for example. Subsequently, in order to restore the original unencrypted file name, a set of the encrypted file name and the name of the unencrypted file 141 is encrypted by using the internal data encryption key 120 and the internal data encryption/decryption means 118. Thereafter, the encrypted set is stored on the disk 4 as the file name change information 12131 (step 6004). Subsequently, the file encryption means 116 encrypts the location information of the unencrypted file 141 on the disk 4 (location information of the directory in which the unencrypted file 141 has been stored) by using the internal data encryption key 120 and the internal data encryption/decryption means 118 and then stores the encrypted location information on the disk 4 as the file location information 12141 (step 6005). Subsequently, the file encryption means reads out the data of the unencrypted file 141 from the disk 4, makes the data encryption/decryption means 119 encrypt the data thus read out by using the internal data encryption key 120 and the file encryption kev 1212 decrypted by the internal data encryption/decryption means 118, and stores the data thus encrypted on the disk 4 as the encrypted file data 1511 (step 6006). The file encryption processing has heretofore been described. In the case where file encryption processing has been started for a plurality of unencrypted files, the processing of the steps 6003 through 6005 is repeated (step 6007). However, the procedure heretofore described is only an example. Especially in the case where a plurality of files are to be encrypted, it is a matter of course that a contrivance such as increasing the processing speed by altering the procedure so as to encrypt file name change information and file location information for a plurality of files collectively and store the encrypted information collectively is also possible in the present invention.

The processing procedure at the time of file decryption will now be described by referring to the flow chart shown in FIG. 9. For example, the user points to a metaphor of file encryption and depresses the mouse twice consecutively (hereafter referred to double click) to start the user interface 1112. Thereupon, the user interface 1112 starts the file decryption processing (step 7001). The user interface will be described in detail afterwards by referring to another embodiment. As the processing of file decryption, the user interface 1112 first requests the user to input a password in order to conduct the authentication of the user (step 7002). When the user inputs a password, the user interface delivers the password to the user authentication means 115. Upon receiving the password, the user authentication means 115 takes out the encrypted password 1211 from the disk 4, decrypts the password 1211 by using the internal data encryption key 120 and the internal data encryption/decryption means 118, compares the decrypted password 1211 with the password inputted by the user, and determines whether the user is a proper user (steps 7003 and 7004). In the case where noncoincidence is caused by an improper password, warning is given to the user in the form of a message, for example, and the processing is finished (step 7005). If the passwords coincide with each other, the user interface 1112 starts window display processing for file decryption. First, in order to display the list of encrypted files on the window, the user interface 1112 requests the list of encrypted file names from the file decryption means 117. Upon receiving the request for the list of the encrypted file names, the file decryption means 117 takes out the file name change information 12131, 12132, and so on one after another, and decrypts them by using the internal data encryption key 120 and the internal data encryption/decryption means 118. When all of file name change information located on the encrypted data area 121 relating to the encryption metaphor currently selected has been acquired, a list of original unencrypted files for encrypted files is created (step 7006) and the list is returned to the user interface 1112. All of file name change information located on the encrypted data area 121 which has been decrypted is held in an appropriate buffer in order to use it when conducting file decryption afterwards. Upon receiving the list of the encrypted plain text file names, the user interface 1112 displays the list on the window (step 7007). Subsequently, the user selects a file to be decrypted from the list of the encrypted plain text file names on the window (step 7008).

The user interface 1112 creates the list of selected file names and delivers the list to the file decryption means 117 together with a file decryption request. Upon receiving the file decryption request, the file decryption means 117 first reads out the file encryption key 1212 and decrypts the file encryption key 1212 by the internal data encryption key 120 and the internal data encryption/decryption means 118. Thereafter, the file decryption means successively takes out file names included in the list of file names selected by the user, searches a coincident file name from unencrypted file names of file name change information decrypted and held in the buffer at the time of creation of the list of all encrypted files, and converts the coincident file name to the encrypted file name stored in the encrypted file data area 151 (step 7009). The file decryption means acquires file location information associated with this encrypted file from file location information on the encrypted data area 121 and determines the location of the original file on the disk 4 (step 7010). Furthermore, the file decryption means reads out data of the encrypted file having the converted encrypted file name from the encrypted file data 151, decrypts the data of the encrypted file by using the decrypted file encryption key 1212 and the data encryption/decryption means 119, and stores the decrypted data of the encrypted file on the original location of the disk as an unencrypted (or plain text) file (step 7011). The processing of the steps 7009 through 7011 of the file decryption means 117 is repeated for all files selected by the user (step 7012). The decryption processing has heretofore been described.

Figure 8:
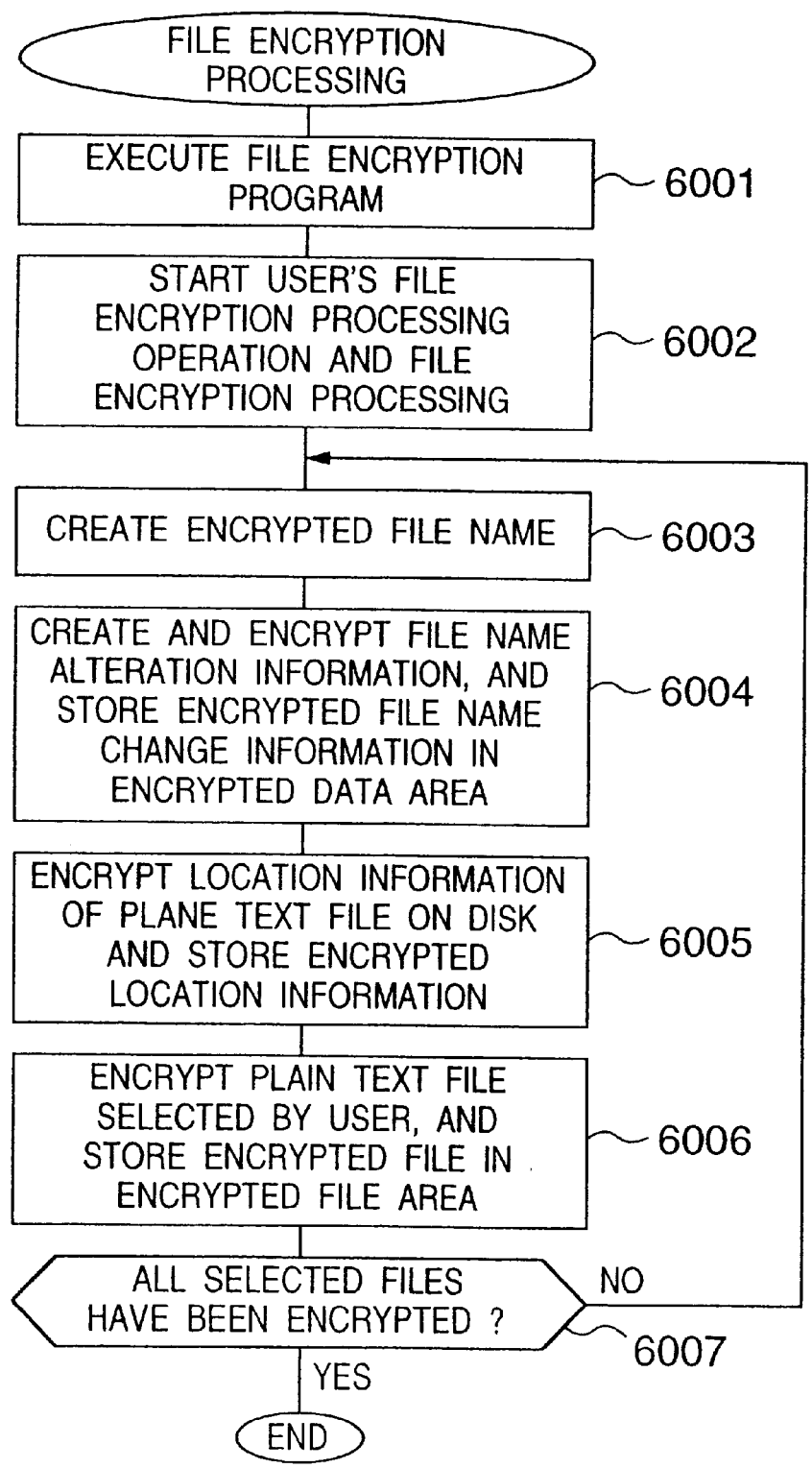
FIG. 8 is a flow chart showing the procedure of file encryption processing.
Figure 9:
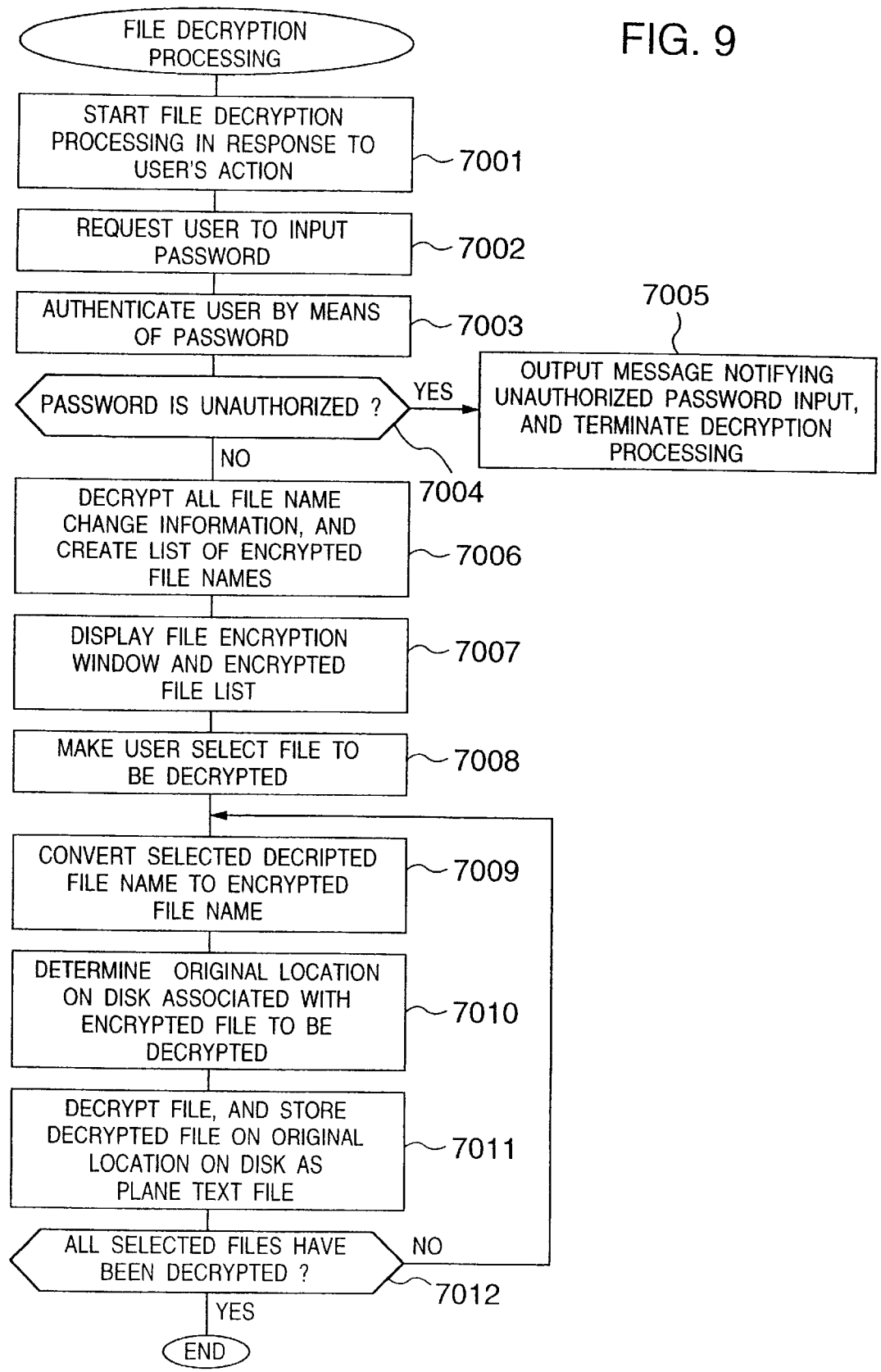
FIG. 9 is a flow chart showing the procedure of file decryption processing.

Processes of FIGS. 7 through 9 can be described individually or collectively on a computer-readable disk or semiconductor memory in the form of a program. Its aspect is also included in the present invention.

In the operating system "MS-Windows" of Microsoft Corporation of U.S., user interface using Graphical User Interface (hereafter referred to as GUI) is implemented on personal computers. (MS-Windows is the trademark of Microsoft Corporation.) The user interface in an embodiment in which the present invention is applied to the operating system "MS-Windows" will now be described by using diagrams showing concrete images of the screen.

In the present embodiment, a "safe folder" has been implemented as a file encryption metaphor. The "safe folder" is modeled after a safe which is the most common as a tool for implementing the security function in daily life. By using such a thing of daily life as a metaphor together with simple manipulation, end users can readily manipulate a function providing a high-degree of security.

Figure 10:
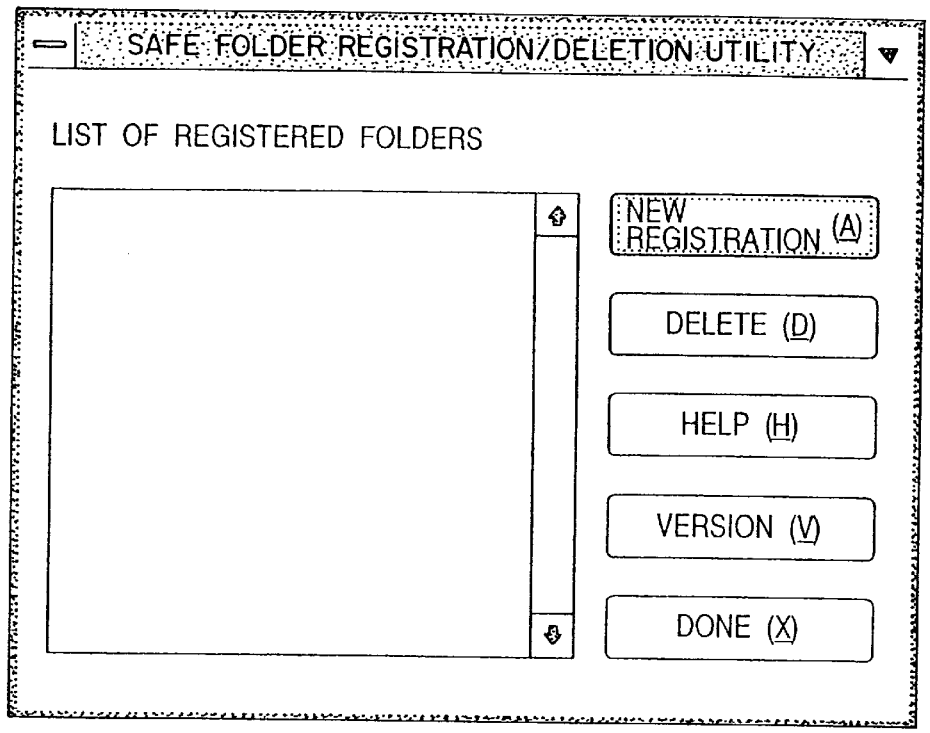
FIG. 10 is a diagram showing a safe folder registration/deletion utility window which is an embodiment of the present invention.
Figure 11:
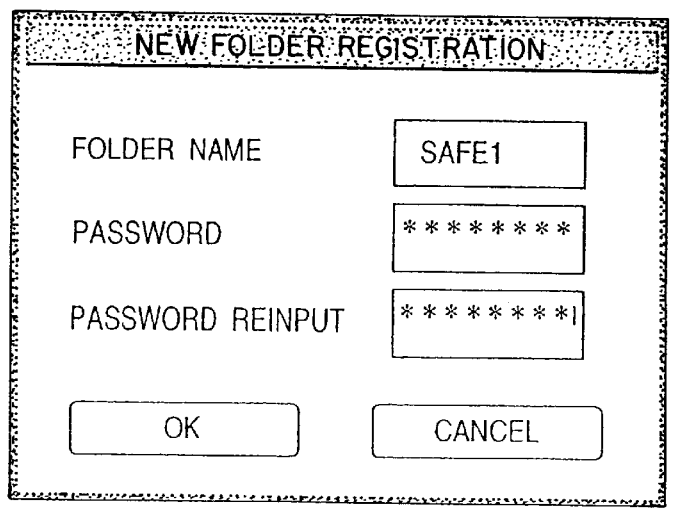
FIG. 11 is a diagram showing a new folder registration window of a safe folder.

FIG. 10 shows the image of the window of a safe folder registration/deletion utility for implementing the registration function of the file encryption metaphor. The user selects a new registration button by pointing it with a mouse. The user then depresses a button of the mouse and release it immediately. (Hereafter, manipulation of selecting an icon by pointing to it with the mouse, depressing the mouse button, and releasing the mouse button is referred to as a click.) By the click, the new registration of a safe folder is started and a new folder registration window as shown in FIG. 11 is displayed.

In the present embodiment, registration of a plurality of encrypted metaphors is implemented as described before with reference to the embodiment of FIG. 6. In the new folder registration window of FIG. 11, a folder name is inputted. In the case where a plurality of safe folders are registered, the user can make a distinction among folders by the folder names. Furthermore, in the new folder registration window of FIG. 11, password inputting is performed. It forms the basis of user authentication and encryption key generation. In order to prevent an input mistake, a password reinput request is also issued.

Figure 12:
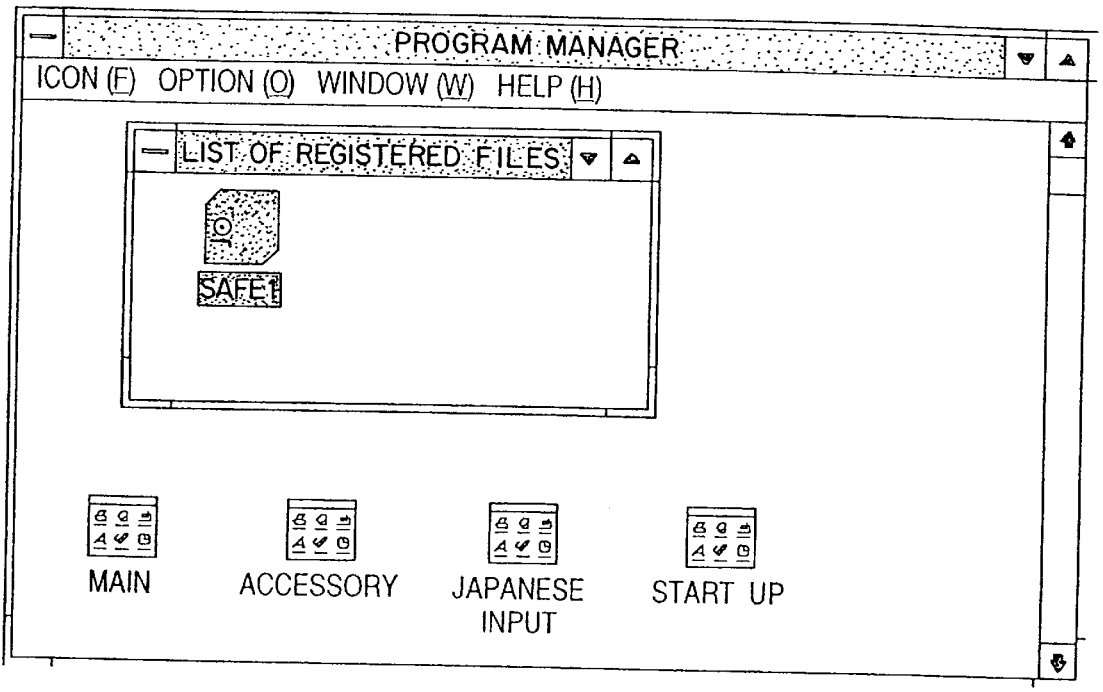
FIG. 12 is a diagram showing the window of a program manager in which the safe folder has been registered.

By the above described new folder registration, an icon having the shape of a safe as the metaphor of the safe folder has been registered in the program manager which is the program execution utility of the MS-Windows as shown in FIG. 12. If a plurality of safe folders are registered by repeating the new folder registration, then a plurality of safe folder icons each having a different name at the bottom of the icon are registered in the safe folder list window.

Figure 13:
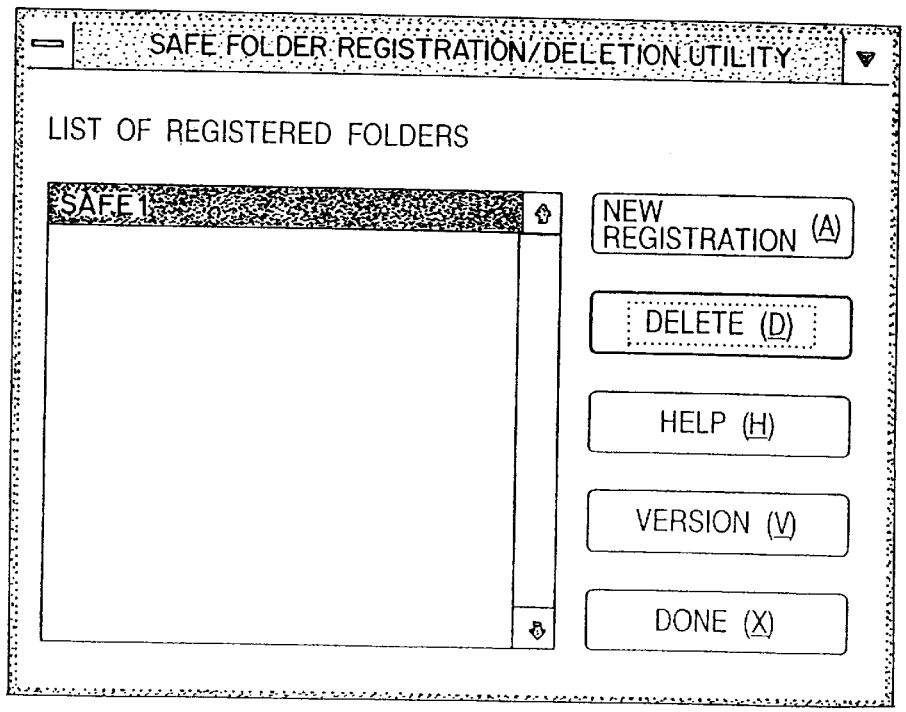
FIG. 13 is a diagram showing a safe folder registration/deletion utility window which is an embodiment of the present invention.
Figure 14:
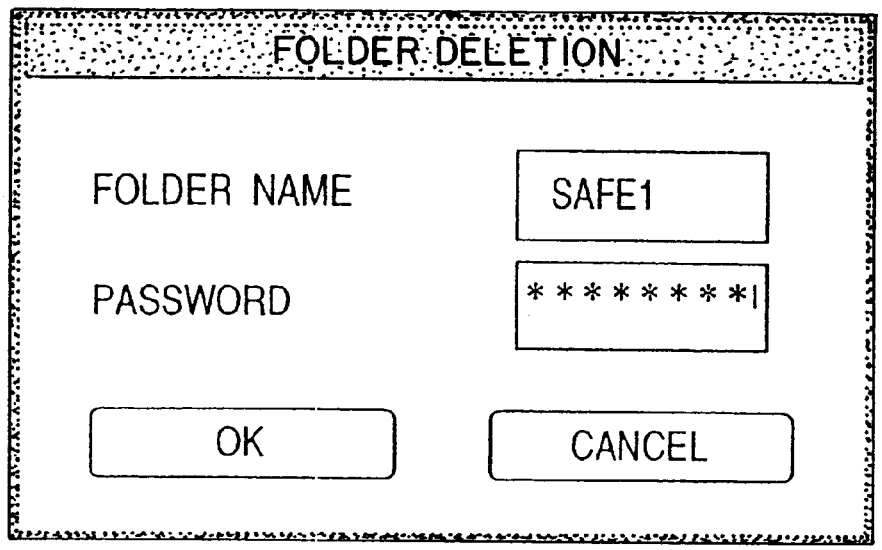
FIG. 14 is a diagram showing a folder deletion window of a safe folder.

FIG. 13 shows the manipulation for deleting a registered safe folder in the same safe folder registration/deletion utility window as FIG. 10. In the display area showing the list of registered folders, a safe folder is selected by clicking with the mouse and a deletion button is selected. Thereupon, a folder deletion window is displayed as shown in FIG. 14. By inputting the password inputted at the time of safe folder registration, the safe folder is deleted. This deletion function was not described for reasons of convenience by referring to the embodiment shown in the block diagram of FIG. 6. However, the deletion function can be implemented by deleting the file in the encrypted data area associated with the deleted safe folder, the directory in the encrypted file area, and the encrypted file located under the directory.

Figure 15:
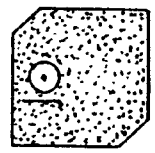
FIG. 15 is a diagram showing icons in the case where the safe folder has been executed.

In the state of FIG. 12, the program for performing encryption and decryption has been registered in the program manager, but the program is not yet effected. Once the safe folder icon is registered in the program manager, the program for performing encryption and decryption of the safe folder can be executed by clicking the safe folder icon on the safe folder list window with the mouse twice consecutively. (Hereafter, clicking with the mouse twice consecutively is referred to as a double click.) FIG. 15 shows the safe folder icon in the case where the program of the safe folder has been executed by the above described manipulation. In the same way as the execution state of an ordinary program, the icon of the safe folder at the time of execution is displayed in the wallpaper area forming the background of MS-Windows. By manipulating the safe folder icon in this state, file encryption and decryption can be done very simply.

Figure 16:
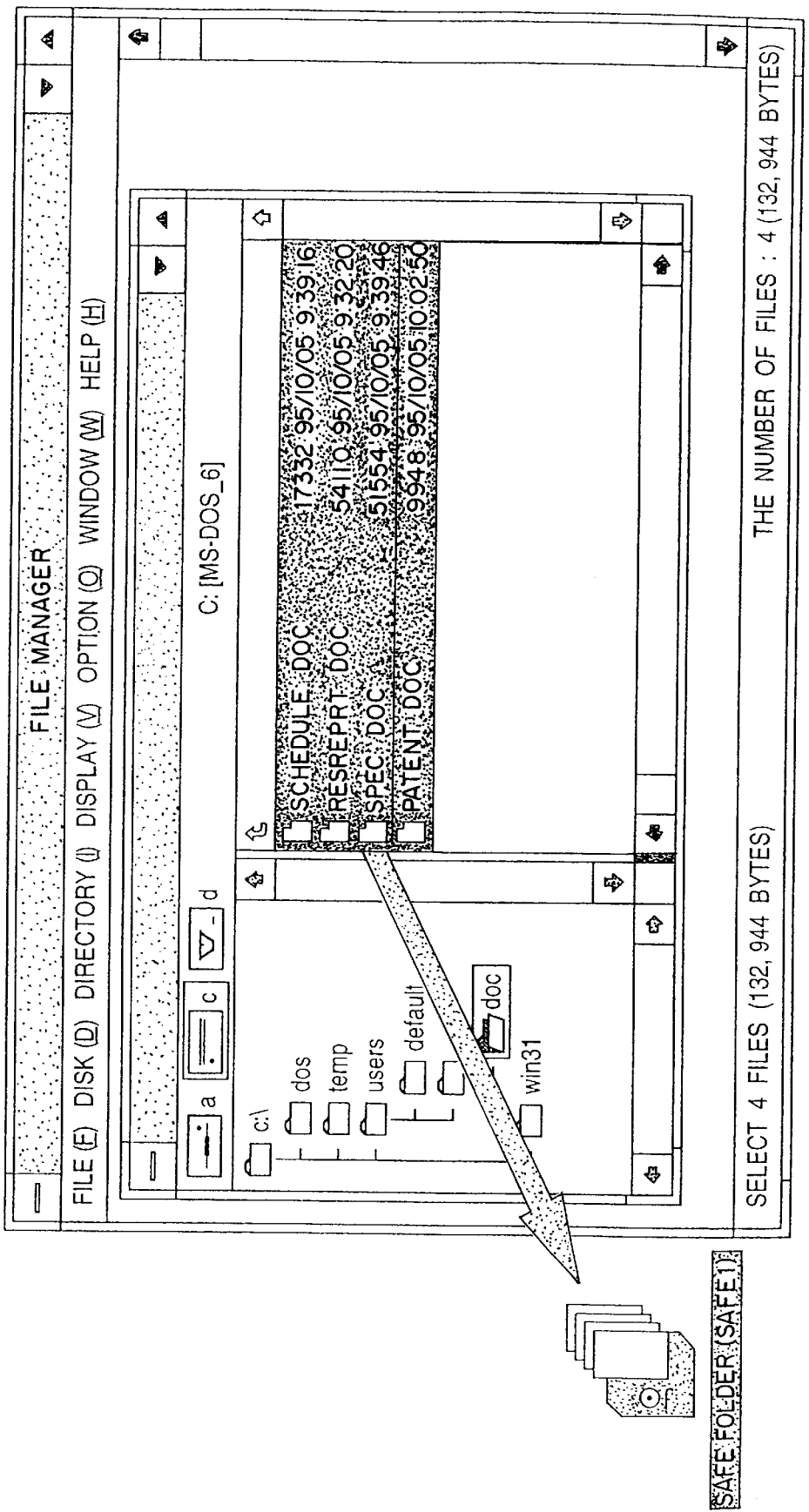
FIG. 16 is a diagram showing a manipulation screen for encrypting a file in the safe folder via the file manager.

FIG. 16 shows the screen obtained when encryption of a plurality of files has been performed starting from the safe folder icon in the execution state. First, on the window displaying the list of file names of the file manager which is the file management utility of MS-Windows, the mouse pointer is moved on a plurality of file names while depressing the mouse button and the mouse button is released when selection has been effected. (Hereafter, the manipulation of moving the mouse while depressing the mouse button and releasing the mouse button is referred to as drag and drop.) By this manipulation, a plurality of files to be encrypted are selected. By only starting again the drag and drop manipulation for the selected files and conducting the drop manipulation (manipulation of releasing the mouse button), a plurality of selected files are encrypted. If the safe folder program is executed to bring about the icon display state, files can be encrypted via the file manager at any time with the extremely simple drag and drop manipulation. As described with reference to the embodiment having the block diagram of FIG. 6, an encryption key is automatically and internally generated from the password used for user authentication at the time of registration of the encrypted metaphor, i.e., the safe file. Therefore, the user need not be conscious of the encryption key. At the time of encryption, encryption is performed by using the encryption key implicitly. Therefore, user authentication is not needed. These are very effective in simplifying the manipulation. If the safe folder is set so as to be automatically executed, for example, when the MS-Windows are executed, the user can encrypt information files of private information memos and secret documents relating to the business readily at any time by using the high-degree encryption function and preserve them without a fear of being observed by a third person.

Since encryption can be performed readily, some users might be anxious about inadvertent encryption. For such users, a function of conducting authentication using the password only in the case of the first encryption after the execution of the safe folder can be provided. This function can be easily implemented by disposing a counter for counting the times of encryption processing in the user interface of file encryption and performing user authentication with the user authentication means 115 only when the encryption processing is first started. It is possible to make the user select such operations in the form of selection branches at the time of registration of the safe folder.

Figures 17, 18:
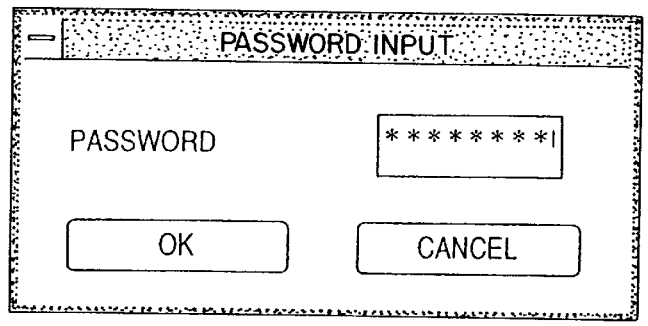
FIG. 17 is a diagram showing a password input window for opening a window in the safe folder.
FIG. 18 is a diagram showing a decryption window of the safe folder.

In the present embodiment, file decryption processing is started by double clicking on the safe folder. By double-clicking on the safe folder, a password input window as shown in FIG. 17 is displayed. If the password is coincident with the password specified by the user at the time of the safe folder registration, the file decryption window of FIG. 18 can be opened. It is needless to say that the file decryption window cannot be opened if the password is wrong. Therefore, a third person who does not know the password cannot access the encrypted files.

Figure 19:
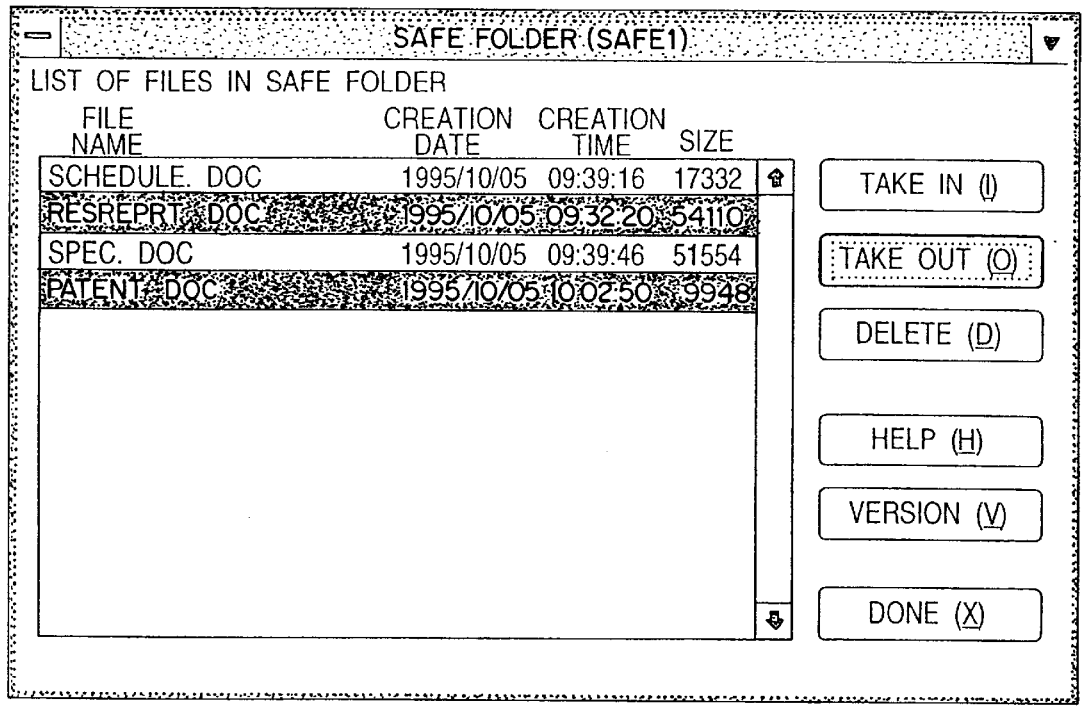
FIG. 19 is a diagram showing a decryption operation of a file on the decryption window of the safe folder.
Figure 20:
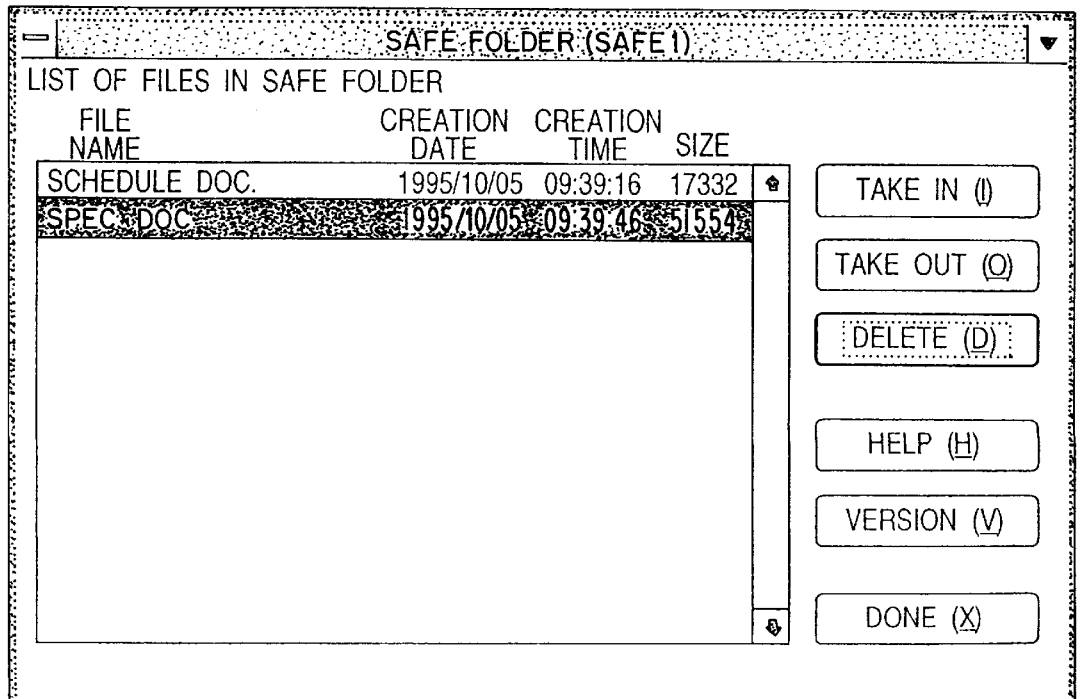
FIG. 20 is a diagram showing an operation of deleting an encrypted file.

In the file decryption window, a list of files already encrypted and stored in the safe folder is displayed as shown in FIG. 18. As for the file decryption, file names to be decrypted are clicked with the mouse on the list of encrypted files and thus selected as shown in FIG. 19. By then clicking a takeout button, original unencrypted files of the selected files are restored and stored in the directory in which they were stored before encryption. Furthermore, by selecting files with the mouse in the same way and clicking on the deletion button as shown in FIG. 20, file deletion can be performed.

As described with the embodiment shown in the block diagram of FIG. 6, unencrypted file names are altered to file names using serial numbers, for example, when encrypted. Even if the encrypted file area 151 of the safe folder is observed or read with the file management utility such as the file manager, it is not possible to know what kinds of files they are without referring to the list of the above described decryption window. As a result, higher secrecy is provided.

What is claimed is:

1. In a data encryption system for encrypting/decrypting information on a computer, a file encryption apparatus comprising:
    storage area means for storing one or more encrypted files with a specific encryption key associated with said storage area means and storing encrypted information for managing the files;
    password registration means for registering an authentication password required for a user to access said storage area means; and
    file encryption/decryption means for encrypting an unencrypted file specified by a user by using the specific encryption key associated with the storage area means.

2. A file encryption apparatus according to claim 1, further comprising:
    file name conversion means for converting a file name of said unencrypted file to a file name of an internal encrypted file of said storage area means;
    a file association table between said unencrypted file name and said encrypted file name; and
    internal data encryption/decryption means for encrypting internal data relating to encryption inputted to said storage area means,
    whereby said storage area means being concealed from users.

3. A file encryption apparatus according to claim 1, further comprising:
    automatic encryption key generation means for automatically generating said encryption key associated with said storage area means on the basis of said authentication password; and
    said file encryption/decryption means performing file encryption and file decryption by using said encryption key automatically generated by said automatic encryption key generation means.

4. A file encryption apparatus according to claim 3, wherein said file encryption apparatus further comprises internal data encryption/decryption means for encrypting internal data relating to encryption inputted to said storage area means,
    wherein said authentication password is encrypted by said internal data encryption/decryption means and registered and held in a storage area of said password registration means, and
    wherein when encrypting said unencrypted file, said unencrypted file is encrypted by decrypting said authentication password, generating automatically an encryption key in said automatic encryption key generation means, and using said encryption key.

5. A file encryption apparatus according to claim 1, further comprising storage area invalidating means for invalidating said storage area means in response to improper authentication passwords inputted at least a specific number of times.

6. A file encryption apparatus according to claim 5, further comprising storage area backup means for making said storage area means invalidated by said storage area invalidating means usable again as said storage area means.

7. A file encryption apparatus according to claim 1, further comprising storage area generation means for generating a plurality of said storage area means and assigning said encryption key and said authentication password to each of said plurality of storage areas independently.

8. A file encryption apparatus according to claim 1, wherein said storage area means comprises a location information table indicating a location, on a memory device before encryption, of said encrypted file stored in said storage area means, and
    wherein when decrypting said encrypted file, an unencrypted file obtained after decryption is automatically returned to the original location on the memory device.

9. A file encryption apparatus according to claim 1, further comprising:
    external file conversion means for converting all data of said storage area means to an external file capable of being transferred to another computer; and
    storage area generation means for regenerating said storage area means from said external file, transfer of information of said storage area means to another computer being made possible by said storage area generation means and said external file conversion means.

10. A file encryption apparatus according to claim 1, further comprising self-decryption program generation means for generating a self-decryption program file by combining all data of said storage area means into a file decryption processing program, said self-decryption program file being transferred to another computer and executed, said self-decryption program file being capable of automatically decrypting said encrypted file included in said storage area in response to input of said authentication password.

11. A file encryption apparatus according to claim 1, further comprising user interface means for displaying a graphic metaphor easily reminding of an encryption apparatus, such as a safe, on a display screen of a computer as a subject of file encryption, and performing file encryption in response to simple manipulations of file selection and selection of said graphic metaphor.

12. A method for encrypting and decrypting information on a computer, using an apparatus, said method comprising the steps of:

providing a storage area defined as a storage folder, formed by specifying an encrypted file area for storing encrypted files obtained by encrypting plain text files as said information, an encrypted data area for storing plain text file names in association with encrypted file names, and a password storage area for storing a password obtained by encrypting, by means of a system key, a password inputted by a user;

in encryption, generating an encrypted password by using a system key from a password inputted by an encryption user and storing said encrypted password in said password storage area;

decrypting said encrypted password by using the system key and generating an encryption key;

encrypting a specified plain text file by using said encryption key and said encrypted plain text file in said encrypted file area; and registering a table representing the relation of plain text file names with encrypted file names in said encrypted data area;

in decryption displaying said registered association table of the encrypted data area on the basis of a password inputted by an decryption user;

making the decryption user specify a file name to be decrypted by referring to said displayed table;

generating said encryption key on the basis of said inputted password; and decrypting an encrypted file having said specified file name by using said generated encryption key.

13. A method according to claim 12, further comprising, in said decryption, the steps of:

receiving a password input from a user; comparing the inputted password with the password stored in said password storage area; and allowing or refusing execution of the decryption process according to a result of said step of comparing.

14. A method according to claim 12, further comprising the steps of:

setting a plurality of said storage areas; and displaying said plurality of storage areas on a display screen by using metaphor icons representing respective areas in distinction from each other.

15. A method according to claim 14, further comprising the steps of:

starting the decryption process by specifying a file name displayed on said display screen with a pointing device and specifying one of icons displaying said plurality of storage areas with said device by using an overlap relation.

16. A method according to claim 12, wherein in said decryption said file name represents an encrypted file stored in the encrypted file area included in the storage area.

17. A computer program encoded in a computer readable memory medium for directing information encrypting and decrypting operations on the computer, when executed by a computer causes the computer to perform the following:

providing a storage area (storage folder) formed by specifying an encrypted file area for storing encrypted files obtained by encrypting unencrypted or plain text files as said information, an encrypted data area for storing plain text file names in association with encrypted file names, and a password storage area for storing a password obtained by encrypting, by means of a system key, a password inputted by a user;

in encryption, generating an encrypted password by using a system key from a password inputted by an encryption user and storing said encrypted password in said password storage area;

decrypting said encrypted password by using the system key and generating an encryption key;

encrypting a specified noncryptic file by using said encryption key and said encrypted plain text file in said encrypted file area; and registering said table representing the relation of plain text file names with encrypted file names in said encrypted data area;

in decryption displaying said registered association table of the encrypted data area on the basis of a password inputted by an decryption user;

making the decryption user specify a file name to be decrypted by referring to said displayed table;

generating said encryption key on the basis of said inputted password; and decrypting an encrypted file having said specified file name by using said generated encryption key.

18. A medium according to claim 17, further comprising, in said decryption, receiving a password input from the decryption user, comparing the inputted password with the password stored in said password storage area; and allowing or refusing execution of the decryption process according to a result of the step of comparing.

19. A method of encrypting information comprising the steps of:

creating an encryption folder for holding a plurality of encrypted files;

receiving from a user a password associated with the encryption folder;

authenticating the password to provide the user access to files in the encryption folder;

storing the password in the encryption folder;

receiving a user selection of an unencrypted data file to be encrypted;

retrieving the password stored in the encryption folder;

automatically generating an encryption key associated with the encryption folder based on the retrieved password; and encrypting the selected data file using the encryption key.

20. The method of claim 19 and further comprising the step of storing the encrypted data file in the encryption folder.

21. The method of claim 19 and further comprising the steps of:
- generating a file name of the encrypted file based on a file name of the unencrypted file
- storing a file association table identifying the encrypted file name and the unencrypted file name in the storage means.

22. A method of encrypting information comprising the steps of:
- creating an encryption folder for holding a plurality of encrypted files;
- receiving from a user a password associated with the encryption folder;
- authenticating the password to provide the user access to files in the encryption folder;
- encrypting the password;
- storing the encrypted password in the encryption folder;
- receiving a user selection of a data file to be encrypted;
- retrieving the password stored in the encryption folder;
- decrypting the retrieved password;
- automatically generating an encryption key associated with the encryption folder based on the decrypted password; and
- encrypting the selected data file using the encryption key.

* * * * *